United States Patent [19]

Stockinger et al.

[11] Patent Number: 4,721,770
[45] Date of Patent: Jan. 26, 1988

[54] EPOXY RESIN COMPOSITIONS CONTAINING N-CYANOCARBOXYLIC ACID AMIDES AS HARDENERS

[75] Inventors: Friedrich Stockinger, Hölstein; Friedrich Lohse, Oberwil; Roland Moser, Basel, all of Switzerland

[73] Assignee: Ciba-Geigy Corporation, Ardsley, N.Y.

[21] Appl. No.: 877,913

[22] Filed: Jun. 24, 1986

Related U.S. Application Data

[62] Division of Ser. No. 466,457, Feb. 15, 1983, Pat. No. 4,618,712.

[30] Foreign Application Priority Data

Feb. 23, 1982 [CH] Switzerland .......................... 1107/82

[51] Int. Cl.⁴ ........................ C08G 59/40; C08G 65/00
[52] U.S. Cl. ........................................ 528/109; 528/111; 528/119; 528/122; 528/123; 523/455; 523/461; 564/91; 564/103; 564/105; 564/106; 564/119
[58] Field of Search .................. 564/91, 103, 105, 106; 528/119, 109, 111, 122, 123; 523/455, 461

[56] References Cited

U.S. PATENT DOCUMENTS

| | | | |
|---|---|---|---|
| 3,564,607 | 2/1971 | Breuer | 556/118 |
| 4,013,706 | 3/1977 | Anatol et al. | 564/106 |
| 4,049,711 | 9/1977 | Kray | 564/105 |
| 4,435,549 | 3/1984 | Lin | 528/119 |

FOREIGN PATENT DOCUMENTS

| | | | |
|---|---|---|---|
| 0078503 | 5/1983 | European Pat. Off. | 528/119 |
| 2022492 | 12/1971 | Fed. Rep. of Germany | 564/105 |

*Primary Examiner*—Charles F. Warren
*Assistant Examiner*—John A. Sopp
*Attorney, Agent, or Firm*—Luther A. R. Hall

[57] ABSTRACT

N-Cyanocarboxylic acid amide derivatives which contain two or three

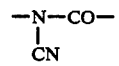

groupings in the molecule are useful as hardeners for epoxide resins.

3 Claims, No Drawings

EPOXY RESIN COMPOSITIONS CONTAINING N-CYANOCARBOXYLIC ACID AMIDES AS HARDENERS

This is a divisional of application Ser. No. 466,457, filed on Feb. 15, 1983, now U.S. Pat. No. 4,618,712, issued on Oct. 21, 1986.

The present invention relates to N-cyanocarboxylic acid amide derivatives which contain two or three

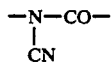

groupings in the molecule, processes for their preparation and the use of the compounds according to the invention as hardeners for epoxide resins.

The use of dicyandiamide as a hardener for epoxide resins has been known for a long time. Hardenable mixtures consisting of epoxide resin, dicyandiamide and, if necessary, a hardening accelerator have a certain storage life which is substantially based on the fact that the dicyandiamide and, where relevant, the accelerator are sparingly soluble in the epoxide resin and are thus dispersed in this resin. The disadvantage of such mixtures is that sedimentation of the undissolved particles of hardener may occur during storage or processing, and thus inhomogeneously hardened products with poorer mechanical properties are obtained.

We have found that the above disadvantages can be avoided if the compounds according to the invention are used as hardeners for epoxide resins. The N-cyanocarboxylic acid amide derivatives according to the invention have the advantage that they are readily soluble in the epoxide resin, without impairing the storage stability of the hardenable epoxide resin mixtures.

The present invention thus relates to N-cyanocarboxylic acid amide derivatives containing two or three

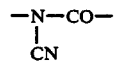

groupings in the molecule, of the formulae I to III

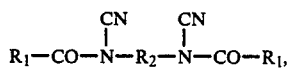 (I)

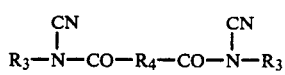 (II)

and

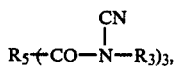 (III)

in which $R_1$ is unsubstituted or substituted alkyl having 1 to 8 carbon atoms, cycloalkyl having 5 to 8 carbon atoms or unsubstituted or substituted aryl having 6 or 10 ring carbon atoms, $R_2$ is alkylene having 2 to 12 carbon atoms, which may be interrupted by O or S atoms, but-2-enylene, but-2-ynylene, phenylenedimethylene or a radical of the formula

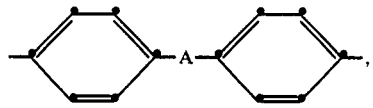

in which —A— is —$CH_2$—, —$SO_2$— or —O—, $R_3$ is unsubstituted or substituted alkyl having 1 to 8 carbon atoms, unsubstituted or substituted phenyl or aralkyl having not more than 12 carbon atoms, cycloalkyl having 5 to 8 carbon atoms, allyl or methallyl, $R_4$ is a direct bond, alkylene having 1 to 12 carbon atoms which may be interrupted by O or S atoms, 1,3- or 1,4-cyclohexylene or 1,3- or 1,4-phenylene and $R_5$ is a radical of the formula

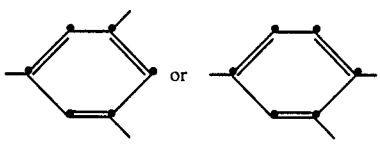

Preferably, in the formulae I to III, $R_1$ is alkyl having 1 to 4 carbon atoms, cyclohexyl or unsubstituted or substituted phenyl, $R_2$ is alkylene having 2 to 6 carbon atoms, phenylenedimethylene or a radical of the formula

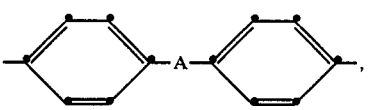

in which —A— is —$CH_2$—, —$SO_2$— or —O—, $R_3$ is alkyl having 1 to 4 carbon atoms, unsubstituted or substituted benzyl or allyl, $R_4$ is alkylene having 2 to 8 carbon atoms, 1,3- or 1,4-cyclohexylene or 1,3- or 1,4-phenylene and $R_5$ is a radical of the formula

Particularly preferred N-cyanocarboxylic acid amide derivatives are those compounds of the formulae I and II in which $R_1$ is alkyl having 1 to 4 carbon atoms, cyclohexyl or unsubstituted or substituted phenyl, $R_2$ is alkylene having 2 to 6 carbon atoms, phenylenedimethylene or a radical of the formula

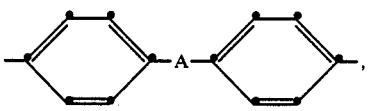

in which —A— is —$CH_2$—, —$SO_2$— or —O—, $R_3$ is alkyl having 1 to 4 carbon atoms, unsubstituted or substituted benzyl or allyl, $R_4$ is alkylene having 2 to 8 carbon atoms, 1,3- or 1,4-cyclohexylene or 1,3- or 1,4-phenylene and $R_5$ is a radical of the formula

The alkyl groups $R_1$ and $R_3$ can be straight-chain or branched and unsubstituted or substituted, or also interrupted by either oxygen atoms. Examples of suitable substituents are chlorine and bromine atoms and the nitro group. A cycloalkyl group $R_1$ or $R_3$ can be unsubstituted or likewise substituted with these substituents. Examples of such alkyl groups are methyl, chloromethyl, ethyl, 1-chloroethyl, 2-bromoethyl, n-propyl, isopropyl, 3-bromopropyl, n-butyl, sec.-butyl, n-pentyl, 2-pentyl, n-hexyl, n-heptyl, 3-heptyl and n-octyl.

An aryl group $R_1$ can be unsubstituted or substituted, for example by 1 or 2 halogen atoms, especially chlorine or bromine, 1 or 2 nitro groups or 1 or 2 alkyl or alkoxy groups having 1 to 4, in particular 1 or 2, carbon atoms. Examples of such aryl groups are phenyl, p-nitrophenyl, 3,5-dinitrophenyl, p-tolyl, o-tolyl, 4-chloro-1-nitrophenyl, 2-methoxyphenyl, naphthyl and β-chloronaphthyl.

An alkylene radical $R_2$ or $R_4$ can likewise be branched or substituted by lower alkyl groups, in particular by methyl or ethyl, for example 2,2,4-trimethylhexamethylene or neopentylene.

A radical $R_2$ of the formula

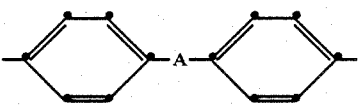

can be unsubstituted or can contain one or more substituents on the ring, for example one or two chlorine or bromine atoms, 1 or 2 alkyl groups having 1 to 4 carbon atoms or 1 or 2 nitro groups.

An aralkyl group $R_3$ can likewise contain one or more substituents on the ring, for example 1 or 2 chlorine or bromine atoms, 1 or 2 nitro groups or 1 or 2 alkyl groups having 1 to 4 carbon atoms, in particular methyl or ethyl.

The N-cyanocarboxylic acid amide derivatives of the formulae I to III according to the invention can be prepared by a process which comprises reacting 1 mol of a dicyandiamine of the formula IV

 (IV)

with 2 mols of a carboxylic acid anhydride of the formula (V)

 (V)

in an organic solvent which does not react with anhydride groups and in the presence or absence of a basic catalyst, or reacting 1 mol of a dicyandiamine salt of the formula VI

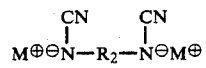 (VI)

with 2 mols of a carboxylic acid halide of the formula VII

 (VII)

or reacting 1 mol of a dihalogeno compound of the formula VIII

 (VIII)

with 2 mols of an N-cyanocarboxylic acid amide salt of the formula IX

 (IX)

in which X is a chlorine or bromine atom and $M^\oplus$ is an Na or K cation, in a polar aprotic solvent to give a compound of the formula I, or reacting 1 mol of a carboxylic acid dichloride or trichloride of the formula X or XI

 (X)

 (XI)

with 2 or, respectively, 3 mols of a cyanamide of the formula XII

 (XII)

in the presence of 2 or, respectively, 3 mols of sodium hydroxide solution or potassium hydroxide solution, or reacting 1 mol of a carboxylic acid dicyandiamide or tricyantriamide salt of the formula XIII or XIV

 (XIII)

 (XIV)

either with 2 or, respectively, 3 mols of an alkylating agent of the formula XV

 (XV)

in which $M^\oplus$ is an Na or K cation and Z is a chlorine, bromine or iodine atom, or, if $R_3$ in formula II or III is methyl or ethyl, with 2 or, respectively, 3 mols of dimethyl sulfate, diethyl sulfate, a dimethyl alkylphosphonate or a diethyl alkylphosphonate, as an alkylating agent, in a polar aprotic solvent to give a compound of the formula II or, respectively, III.

The compounds of the formula I are preferably prepared by reacting 1 mol of a dicyandiamine of the formula IV with 2 mols of a carboxylic acid anhydride of the formula V, or by reacting 1 mol of a dihalogeno compound of the formula VIII with 2 mols of an N-cyanocarboxylic acid amide salt of the formula IX, in which formulae $R_1$ is preferably alkyl having 1 to 4 carbon atoms, cyclohexyl or unsubstituted or substituted phenyl, $R_2$ is preferably alkylene having 2 to 6 carbon atoms, phenylenedimethylene or a radical of the formula

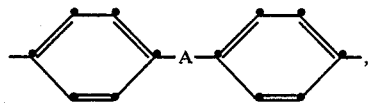

in which —A— is —$CH_2$—, —$SO_2$— or —O—, and $M^\oplus$ is, in particular, an Na cation.

Examples of suitable organic solvents for these reactions are cycloaliphatic or aromatic hydrocarbons, such as cyclohexane, benzene, toluene and the xylenes; aliphatic or cyclic ethers, such as diethyl ether, dioxane and tetrahydrofuran; chlorinated aliphatic hydrocarbons, such as methylene chloride, chloroform, carbon tetrachloride, trichloroethylene and dichloroethane; ethylene glycol dimethyl ether and ethylene glycol diethyl ether; and aliphatic ketones, such as acetone; or the liquid carboxylic acid anhydrides themselves.

If necessary, the reaction of a dicyandiamine of the formula IV with a carboxylic acid anhydride of the formula V can be catalysed by a basic compound. Examples of suitable basic catalysts are tertiary amines, such as triethylamine and tributylamine, heterocyclic bases, such as pyridine and quinoline, N-cyclic bases, such as pyridine, quinoline, N-methylpyrrolidine, imidazole and homologues thereof, and alkali metal alcoholates, such as sodium methylate.

The starting substances of the formulae IV to IX used for the preparation of the N-cyanocarboxylic acid amide derivatives of the formula I are known compounds.

The compounds of the formula II are preferably prepared by reacting 1 mol of a carboxylic acid dicyandiamide salt of the formula XIII with 2 mols of the alkylating agent mentioned in an aprotic solvent. Carboxylic acid dicyandiamide salts of the formula XIII in which $R_4$ is alkylene having 2 to 8 carbon atoms, 1,3- or 1,4-cyclohexylene or 1,3- or 1,4-phenylene and $M^\oplus$ is an Na or K cation, in particular an Na cation, are preferably used.

The carboxylic acid dicyandiamide salts of the formula XIII used as starting substances for the preparation of the N-cyanocarboxylic acid amide derivatives of the formula II according to the invention have not yet been described in the literature, and can be prepared by reacting 1 mol of a dicarboxylic acid diester of the formula XVI $$Y-O-CO-R_4-CO-O-Y \quad (XVI)$$

in which $R_4$ is as defined under formula II and each Y is alkyl having 1 to 4 carbon atoms, benzyl or cyclohexyl, preferably methyl or ethyl, with 2 mols of monosodium or monopotassium cyanamide to give a compound of the formula XIII.

The intermediates of the formula XIII, which have been developed specifically for the preparation of the compounds according to the invention, are novel and are likewise a subject of the present invention.

A carboxylic acid tricyantriamide salt of the formula XIV in which $R_5$ is preferably the radical of the formula

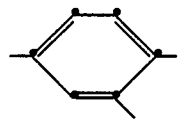

and $M^\oplus$ is, in particular, an Na cation is preferably used for the preparation of the compounds of the formula III according to the invention, and this starting substance is reacted with 3 mols of the alkylating agent mentioned in an aprotic solvent.

The carboxylic acid tricyantriamide salts of the formula XIV used as starting substances for the preparation of the N-cyanocarboxylic acid amide derivatives of the formula III according to the invention have likewise not yet been described in the literature, and can be prepared in a manner similar to that for the carboxylic acid dicyandiamide salts of the formula XIII, by reacting 1 mol of a tricarboxylic acid triester of the formula XVII $$R_5-(CO-O-Y)_3 \quad (XVII)$$

in which $R_5$ is as defined under formula III and Y is as defined under formula XVI, with 3 mols of monosodium or monopotassium cyanamide to give a compound of the formula XLv. The novel intermediates of the formula XIV, which have been developed specifically for the preparation of the compounds of the formula III according to the invention, likewise form a subject of the present invention.

The amount of solvent to be used in the preparation of the compounds of the formulae I to III according to the invention is not critical. Generally, the solvents are used in amounts such that the starting substances are present as 20–50% solutions or suspensions.

The compounds according to the invention can be prepared in a wide temperature range from about 0° to 150° C., preferably at between 80° and 130° C.

As mentioned above, the N-cyanocarboxylic acid derivatives according to the invention are useful hardeners for epoxide resins.

The present invention thus also relates to the use of the N-cyanocarboxylic acid amide derivatives of the formulae I to III in hardenable epoxide resins which contain N-cyanocarboxylic acid amide derivatives and, if necessary, hardening accelerators.

The amount of N-cyanocarboxylic acid amide derivative used as the hardener in these hardenable mixtures is usually chosen such that 0.75 to 1.25 equivalents of N-cyanocarboxylic acid amide group are present per 1 epoxide equivalent. Equivalent amounts of the N-cyanocarboxylic acid amide derivative and the epoxide resin component are preferably used.

Epoxide resins in which groups of the formula XVIII

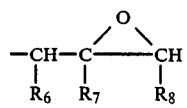

in which either $R_6$ and $R_8$ are each hydrogen atoms, in which case $R_7$ is a hydrogen atom or a methyl group, or $R_6$ and $R_8$ together are —$CH_2CH_2$—, in which case $R_7$ is a hydrogen atom, are bonded directly to oxygen, nitrogen or sulfur atoms can preferably be used for the hardenable mixtures.

Examples of such resins are polyglycidyl and poly-(β-methylglycidyl)esters, which can be obtained by reacting a compound containing two or more carboxylic acid groups per molecule with epichlorohydrin, glycerol dichlorohydrin or β-methylepichlorohydrin in the presence of an alkali. Such polyglycidyl esters can be derived from aliphatic polycarboxylic acids, for example oxalic acid, succinic acid, glutaric acid, adipic acid, sebacic acid or dimerised or trimerised linoleic acid, from cycloaliphatic polycarboxylic acids, such as tetrahydrophthalic acid, 4-methyltetrahydrophthalic acid, hexahydrophthalic acid or 4-methylhexahydrophthalic acid, or from aromatic polycarboxylic acids, such as phthalic acid, isophthalic acid or terephthalic acid.

Other examples are polyglycidyl and poly(β-methylglycidyl)ethers, which can be obtained by reacting a compound containing at least two free alcoholic and/or phenolic hydroxyl groups per molecule with the corresponding epichlorohydrin under alkaline conditions, or in the presence of an acid catalyst followed by treatment with an alkali. These ethers can be prepared with epichlorohydrin from acyclic alcohols, such as ethylene glycol, diethylene glycol and higher poly-(oxyethylene)glycols, propane-1,2-diol and poly-(oxypropylene)glycols, propane-1,3-diol, butane-1,4-diol, hexane-2,4,6-triol, glycerol, 1,1,1-trimethylolpropane, pentaerythritol or sorbitol, cycloaliphatic alcohols, such as resorcitol, quinitol, bis-(4-hydroxycyclohexyl)-methane, 2,2-bis-(4-hydroxycyclohexyl)-propane or 1,1-bis-(hydroxymethyl)-cyclohex-3-ene, or alcohols with aromatic nuclei, such as N,N-bis-(2-hydroxyethyl)-aniline or p,p'-bis-(2-hydroxyethylamino)-diphenylmethane. Other suitable epoxide resins are those for mononuclear phenols, such as resorcinol or hydroquinone, or polynuclear phenols, such as bis-(4-hydroxyphenyl)-methane, 4,4'-dihydroxydiphenyl, bis-(4-hydroxyphenyl)sulfone, 1,1,2,2-tetrakis-(4-hydroxyphenyl)-ethane, 2,2-bis-(4-hydroxyphenyl)-propane (bisphenol A) and 2,2-bis-(3,5-dibromo-4-hydroxyphenyl)-propane, and novolaks formed from aldehydes, such as formaldehyde, acetaldehyde, chloral or furfuraldehyde, and phenols, such as phenol itself or phenol which is ring-substituted by chlorine atoms or alkyl groups with in each case not more than nine carbon atoms, such as 4-chlorophenol, 2-methylphenol or 4-tert.-butylphenol.

Examples of other suitable poly-(N-glycidyl) compounds include those which are prepared by dehydrochlorination of the reaction products of epichlorohydrin and amines containing at least two amino-hydrogen atoms, such as aniline, n-butylamine, bis-(4-aminophenyl)-methane and bis-(4-methylaminophenyl)-methane, as well as triglycidyl isocyanurate or N,N'-diglycidyl derivatives of cyclic alkyleneureas, such as ethyleneurea or 1,3-propyleneurea, or hydantoins, such as 5,5-dimethylhydantoin.

Examples of epoxide resins containing groups of the formula XVIII in which $R_6$ and $R_8$ together are a —$CH_2CH_2$— group are bis-(2,3-epoxycyclopentyl)ether, 2,3-epoxycyclopentyl-glycidyl ether and 1,2-bis-(2,3-epoxycyclopentyloxy)-ethane.

Epoxide resins in which some or all of the epoxide groups are in a middle position can also be used, such as vinylcyclohexane dioxide, limonene dioxide, dicyclopentadiene dioxide, the 3,4-epoxycyclohexylmethyl ester of 3',4'-epoxycyclohexanecarboxylic acid and its 6,6'-dimethyl derivative, the bis-(3,4-epoxycyclohexanecarboxylic acid ester) of ethylene glycol, bis-(3,4-epoxy-6-methylcyclohexyl)adipate and 3-(3,4-epoxycyclohexyl)-8,9-epoxy-2,4-dioxaspiro[5,5]undecane.

In addition to the conventional hardening accelerators, the hardenable mixtures according to the invention can furthermore also contain plasticising agents, such as dibutyl phthalate, dioctyl phthalate or tricresyl phosphate, or additives, such as fillers, reinforcing agents, colorants, flow control agents, flame-retarding substances and mould release agents. Examples of suitable extenders, fillers and reinforcing agents are asbestos, asphalt, bitumen, glass fibres, textile fibres, carbon or boron fibres, mica, aluminas, gypsum, titanium dioxide, chalk, quartz flour, cellulose, kaolin, ground dolomite, wollastonite, silicas having a large specific surface area (obtainable under the tradename "Aerosil"), aluminas modified by long-chain amines (obtainable under the tradename "Bentone"), powdered poly(vinyl chloride), polyolefin or aminoplast, and metal powders, such as aluminium powder or iron powder. Flame-retardants, such as antimony trioxide, can also be added to the hardenable mixtures.

In the examples which follow and which illustrate the invention, parts are by weight, unless indicated otherwise.

EXAMPLE 1

The disodium salt of adipic acid bis-(N-cyanamide)

126.0 g of sodium metal and 2.5 liters of ethyl alcohol are reacted in a glass apparatus equipped with a stirrer, thermometer and dropping funnel and two condensers with drying tubes. When the sodium has reacted completely, a solution of 231.2 g (5.0 mols + 10% excess) of cyanamide in 2 liters of ethanol is added dropwise at 30°–36° C. in the course of 10 minutes, and 435.5 g (2.5 mols) of dimethyl adipate are then added. The mixture is left to react at 77° C. for 19 hours and 45 minutes and is then cooled to room temperature, the suspension is filtered with suction and the residue is washed with ethyl alcohol and dried at 90° C. in vacuo.

The equivalent weight, determined by potentiometric titration, is 122.2 (97.4% of theory). The IR absorption of the nitrile group is at 2,160 cm$^{-1}$. The substance obtained has the following structure:

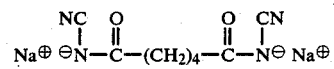

EXAMPLE 2

Adipic acid bis-(N-cyano-methylamide)

476.3 g (2.0 mols) of the disodium salt of adipic acid bis-(N-cyanamide) prepared in Example 1 and 851.6 g (4.0 mols + 50% excess) of methyl iodide are reacted in 1.5 liters of N-methylpyrrolidone at 95°–98° C. for 6 hours and 15 minutes in a glass flask provided with a stirrer, thermometer and condenser. The reaction mixture is then poured into 2 kg of ice and 1 liter of water, while stirring, the resulting suspension is filtered with suction and the residue is washed with water of 0° C., sucked dry and dried over phosphorous pentoxide at room temperature under 0.13 mbar. 380.9 g (85.6% of theory) of a colourless, crystalline product which, after recrystallisation from a mixture consisting of chlorobenzene and hexane (5:1), has a melting point of 86.1°–87.8° C. are obtained.

| Elementary analysis: | |
|---|---|
| calculated | found |
| 54.04% C | 54.07% C |
| 6.35% H | 6.30% H |
| 25.21% N | 25.49% N |

The 100 MHz-¹-NMR spectrum coincides with the following structure:

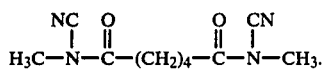

EXAMPLE 3

Adipic acid bis-(N-cyano-ethylamide)

238.2 g (1.0 mol) of the disodium salt of adipic acid bis-(N-cyanamide) and 326.9 g (2.0 mols+50% excess) of ethyl bromide are reacted in 800 ml of dimethylformamide at 78°–96° C. for 22 hours and 20 minutes. The reaction mixture is then introduced into 1.5 kg of ice and 500 ml of water and is extracted with 700 ml of chloroform, the organic phase is separated off and the solution is concentrated on a rotary evaporator at 60° C. in vacuo. The residue is dried to constant weight at 60° C. under 0.13 mbar, and 228.3 g (91.2% of theory) of a brown viscous product, which crystallises completely after a few days, are obtained. The crude product is recrystallised from a mixture of diisopropyl ether and ethyl ether (3:1) to give a colourless, crystalline product which has a melting point of 38.7°–40.1° C.

| Elementary analysis: | |
|---|---|
| calculated | found |
| 57.58% C | 57.32% C |
| 7.25% H | 6.99% H |
| 22.39% N | 22.18% N |

The 60 MHz-¹H-NMR spectrum agrees with the following structure:

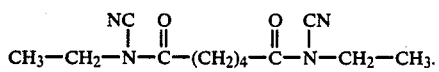

EXAMPLE 4

Adipic acid bis-(N-cyano-isopropylamide)

23.8 g (0.1 mol) of the disodium salt of adipic acid bis-(N-cyanamide) and 36.9 g (0.2 mol+50% excess) of isopropyl bromide are reacted in 120 ml of dimethylformamide at 90°–94° C. for 6 hours and 30 minutes. When the reaction mixture had been cooled to 10° C., the sodium bromide formed is removed by filtration and the solution is concentrated on a rotary evaporator at 80° C. in vacuo. 26.0 g (93.4% of theory) of a brown, viscous crude product, which is recrystallised from diethyl ether and has a melting point of 65° C., are obtained.

| Elementary analysis: | |
|---|---|
| calculated | found |
| 60.41% C | 60.33% C |
| 7.97% H | 8.01% H |
| 20.13% N | 19.94% N |

The 60 MHz-¹H-NMR data correspond to the following structure:

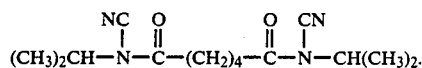

EXAMPLE 5

Adipic acid bis-(N-cyano-n-butylamide)

Analogously to Example 3, 23.8 g (0.1 mol) of the disodium salt of adipic acid bis-(N-cyanamide) and 55.2 g (0.2 mol+50% excess) of n-butyl iodide are reacted in 50 ml of N-methylpyrrolidone at 92°–100° C. for 5 hours and 15 minutes and the mixture is worked up.

28.8 g (94.0% of theory) of a clear, liquid residue, which is purified by bulb tube distillation at 170° C./0.3 mbar, are obtained.

| Elementary analysis: | |
|---|---|
| calculated | found |
| 62.72% C | 62.77% C |
| 8.55% H | 8.82% H |
| 18.29% N | 18.18% N |

The 60 MHz-¹H-NMR spectrum agrees with the following structure:

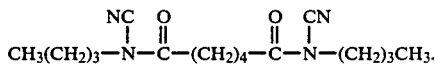

EXAMPLE 6

Adipic acid bis-(N-cyan-allylamide)

71.45 g (0.3 mol) of the disodium salt of adipic acid bis-(N-cyanamide) and 68.9 g (0.6 mol+50% excess) of allyl chloride are reacted in 240 ml of dimethylformamide at 84°–90° C. for 5 hours and 10 minutes and the mixture is worked up as described in Example 4. 77.4 g (99.9% of theory) of a crystalline product, which is purified by recrystallisation in a mixture of 25 parts of diisopropyl ether and 1 part of acetone, are obtained. The product has a melting point of 46.7°–48.2° C.

| Elementary analysis: | |
|---|---|
| calculated | found |
| 61.30% C | 61.39% C |
| 6.62% H | 6.52% H |
| 20.43% N | 20.60% N |

The 60-MHz-¹H-NMR spectrum coincides with the following structure:

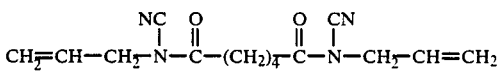

EXAMPLE 7

Adipic acid bis-(N-cyano-2,4-dimethylphenylamide)

A solution of 10.07 g (0.055 mol) of adipyl chloride in 30 ml of acetone is added dropwise to 14.6 g (0.1 mol) of N-cyano-2,4-dimethylaniline in 60 ml of 2N NaOH (0.12 mol) at 10°–26° C. in the course of 40 minutes, while cooling and stirring rapidly, and the reaction mixture is then stirred for another 2 hours and 15 minutes at 15°–25° C. 50 ml of chloroform are then added, the mixture is stirred for 10 minutes, the two phases are separated, the organic phase is dried with anhydrous sodium sulfate, the suspension is filtered with suction and the filtrate is concentrated on a rotary evaporator at 40° C. in vacuo. The residue is recrystallised from 113 ml of ethyl acetate to give 18.7 g (93.0% of theory) of a colourless, crystalline compound with a melting point of 120°–122.2° C.

| Elementary analysis: | |
|---|---|
| calculated | found |
| 71.62% C | 71.50% C |
| 6.51% H | 6.66% H |
| 13.92% N | 14.08% N |

The 100 MHz-$^1$H-NMR data agree with the following structure:

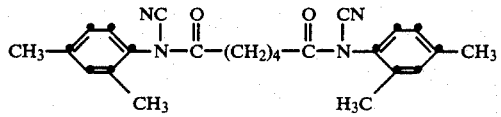

EXAMPLE 8

The disodium salt of glutaric acid bis-(N-cyanamide)

160.17 g (1.0 mol) of dimethyl glutarate and 140.8 g (2.0 mols+10% excess) of monosodium cyanamide are reacted in 500 ml of n-butanol at 74°–114° C. for 5 hours, during which the methanol formed is continuously distilled off. When the reaction has ended, the suspension is stirred at 1°–3° C. for 3 hours and filtered with suction and the residue is dried at 110° C. in vacuo. 166.3 g (74.2% of theory) of a yellowish, crystalline powder which, after recrystallisation from ethanol/water (2:1) has the following analysis data, are obtained.

| Elementary analysis: | |
|---|---|
| calculated | found |
| 25.00% N | 24.78% N |
| 20.52% Na | 20.75% Na |

The IR absorption of the nitrile group is at 2,160 cm$^{-1}$. The substance obtained has the following structure:

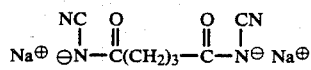

EXAMPLE 9

Glutaric acid bis-(N-cyano-methylamide)

849.4 g (5.44 mols+10% excess) of methyl iodide are introduced into a suspension of 609.6 g (2.72 mols) of the disodium salt of glutaric acid bis-(N-cyanamide) in 2.2 liters of dimethylformamide at 99°–133° C. in the course of 7 minutes, and the mixture is then left to react at 105°–126° C. for a further 2 hours. The mixture is worked up in a manner similar to that in Example 3 to give 524.5 g (92.6% of theory) of crude product, which is recrystallised from toluene. The yield is 320.4 g (56.6% of theory). The product has a melting point of 51.4°–52.8° C.

| Elementary analysis: | |
|---|---|
| calculated | found |
| 51.92% C | 51.88% C |
| 5.74% H | 5.74% H |
| 26.91% N | 26.95% N |

The 60 MHz-$^1$H-NMR spectrum coincides with the following structure:

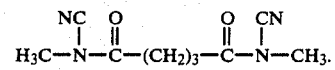

EXAMPLE 10

Glutaric acid bis-(N-cyano-ethylamide)

246.5 g (1.1 mols) of the disodium salt of glutaric acid bis-(N-cyanamide) and 900 ml of dimethylformamide are initially introduced into the reaction vessel at about 90° C., and 411.8 g (2.2 mols+20% excess) of ethyl iodide are added dropwise in the course of 30 minutes, during which the temperature rises to 112° C. as a result of the exothermic reaction. After a further reaction time of 50 minutes at 103°–110° C., the reaction mixture is concentrated at 70° C. in vacuo, the residue is heated in 300 ml of toluene to the boiling point and filtered off with suction, the residue on the filter is treated with 200 ml of toluene as described above, the two filtrates are combined and the solvent is distilled off at 70° C. in vacuo. The crude yield is 206.4 g (79.5% of theory). The crude product is purified by vacuum distillation to give 156.7 g (60.8% of theory) of a slightly yellowish liquid with a boiling point of 143°–146° C./0.13 mbar.

| Elementary analysis: | |
|---|---|
| calculated | found |
| 55.92% C | 55.67% C |
| 6.83% H | 6.89% H |
| 23.71% N | 23.69% N |

The 6b MHz-$^1$H-NMR spectrum is in agreement with the following structures:

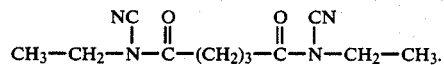

EXAMPLE 11

Glutaric acid bis-(N-cyano-benzylamide)

359.2 g (2.0 mols+5% excess) of benzyl bromide are added dropwise to a suspension of 224.1 g (1.0 mol) of the disodium salt of glutaric acid bis-(N-cyanamide) and 1 liter of dimethylformamide at 20°–70° C. in the course of 40 minutes, the components are reacted at 68°–78° C.

for 3 hours and 50 minutes and the mixture is then filtered with suction. The filtrate is concentrated on a rotary evaporator at 100° C. in vacuo and the residue is recrystallised from 800 ml of toluene. 253.7 g (70.4% of theory) of a colourless, crystalline product which has a melting point of 97.5°–100.4° C. are obtained.

| Elementary analysis: | |
|---|---|
| calculated | found |
| 69.98% C | 70.07% C |
| 5.60% H | 5.70% H |
| 15.55% N | 15.55% N |

The 60 MHz-¹H-NMR spectrum agrees with the following structure:

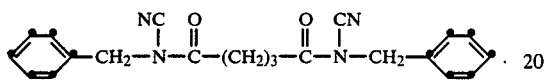

EXAMPLE 12

Glutaric acid bis-(N-cyano-4-nitrobenzylamide)

22.4 g (0.1 mol) of the disodium salt of glutaric acid bis-(N-cyanamide) and 51.85 g (0.2 mol+20% excess) of 4-nitrobenzyl bromide are reacted in 120 ml of dimethylformamide at 36°–40° C. for 1 hour and the mixture is worked up in a manner similar to that in Example 2. 44.3 g (98.4% of theory) of a yellowish crystalline crude product are obtained, and are recrystallised from 440 ml of ethyl acetate. 31.5 g (70.0% of theory) of a colourless, crystalline product of a melting point 146.2°–148.2° C. are obtained.

| Elementary analysis: | |
|---|---|
| calculated | found |
| 56.00% C | 55.88% C |
| 4.03% H | 4.05% H |
| 18.66% N | 18.52% N |

The 60 MHz-¹H-NMR data coincide with the expected structure:

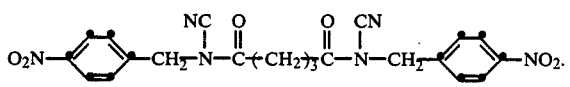

EXAMPLE 13

The disodium salt of succinic acid bis-(N-cyanamide)

438.4 g (3.0 mols) of dimethyl succinate and 422.5 g (6.0 mols+10% excess) of monosodium cyanamide are reacted in 3 liters of ethyl alcohol at 70°–75° C. for 45 hours, and the resulting suspension is then filtered with suction. The residue on the filter is dried at 60° C. in vacuo to give 621 g (98.5% of theory) of a yellowish, crystalline powder, the equivalent weight of which, determined by potentiometric titration, is 108.1. The resulting product has the following structure:

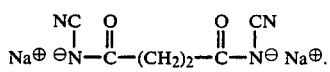

EXAMPLE 14

Succinic acid bis-(N-cyano-methylamide)

105 g (0.5 mol) of the disodium salt of succinic acid bis-(N-cyanamide) and 213 g (1.0 mol+50% excess) of methyl iodide are reacted in 375 ml of N-methylpyrrolidone and the mixture is worked up, in a manner similar to that in Example 2. 68.0 g (70.0% of theory) of a crystalline compound which, after recrystallisation from chlorobenzene, has a melting point of 112.2°–113.9° C. are obtained.

| | calculated | found |
|---|---|---|
| Elementary analysis: | 49.48% C | 49.57% C |
| | 5.19% H | 5.14% H |
| | 28.85% N | 28.63% N |

Structure: CH₃—N—C—(CH₂)₂—C—N—CH₃ with NC, O above and O, CN above respectively.

$$\text{Structure: } CH_3-\underset{\underset{CN}{|}}{N}-\underset{\underset{O}{\|}}{C}-(CH_2)_2-\underset{\underset{O}{\|}}{C}-\underset{\underset{CN}{|}}{N}-CH_3$$

EXAMPLE 15

The disodium salt of sebacic acid bis-(N-cyanamide)

In a manner similar to that in Example 13, 460.6 g (2.0 mols) of dimethyl sebacate and 281.7 g (4.0 mols+10% excess) of monosodium cyanamide are reacted in 2 liters of ethyl alcohol and the mixture is worked up. The yield is 487.5 g (82.8% of theory).

| | calculated | found |
|---|---|---|
| Elementary analysis: | 47.84% C | 47.66% C |
| | 5.62% H | 5.75% H |
| | 18.60% N | 18.27% N |
| | 2.33% H₂O | 2.33% H₂O |
| | 15.26% Na | 15.20% Na |

$$\text{Structure: } Na^{\oplus} \ ^{\ominus}N-\underset{\underset{O}{\|}}{C}-(CH_2)_8-\underset{\underset{O}{\|}}{C}-N^{\ominus} \ Na^{\oplus}$$

EXAMPLE 16

Sebacic acid bis-(N-cyano-methylamide)

441.4 g (1.5 mols) of the disodium salt of sebacic acid bis-(N-cyanamide) and 511 g (3.0 mols+20% excess) of methyl iodide are reacted in 1.5 liters of dimethylformamide and the mixture is worked up, in a manner similar to that in Example 2. The yield is 370.6 g (88.8% of theory) and, after recrystallisation from diisopropyl ether/ethyl acetate (3:1) the product has a melting point of 83.4°–84.0° C.

| | calculated | found |
|---|---|---|
| Elementary analysis | 60.41% C | 60.43% C |
| | 7.97% H | 7.78% H |
| | 20.13% N | 20.14% N |

Structure:

$$CH_2-\underset{\underset{CN}{|}}{N}-\underset{\underset{O}{\|}}{C}-(CH_2)_8-\underset{\underset{O}{\|}}{C}-\underset{\underset{CN}{|}}{N}-CH_3$$

EXAMPLE 17

The disodium salt of 2-methylglutaric acid bis-(N-cyanamide)

As described in Example 13, 34.8 g (0.2 mol) of dimethyl 2-methylglutarate and 28.2 g (0.4 mol+10% excess) of monosodium cyanamide are reacted in 200 ml of ethyl alcohol and the mixture is worked up. 43.15 g (90.6% of theory) of a light yellow, crystalline powder of equivalent weight 134.1 are obtained.

Structure:
$$Na^{\oplus \ominus}N-\underset{\underset{\parallel}{O}}{\overset{\overset{NC}{|}}{C}}-CH-CH_2-CH_2-\underset{\underset{|}{CN}}{\overset{\overset{O}{\parallel}}{C}}-N^{\ominus}Na^{\oplus}$$
$$\quad\quad\quad\quad\quad\quad\quad\quad CH_3$$

EXAMPLE 18

2-Methylglutaric acid bis-(N-cyano-methylamide)

92.3 g (0.4 mol) of the disodium salt of 2-methylglutaric acid bis-(N-cyanamide) and 124.9 g (0.8 mol+10% excess) of methyl iodide are reacted in 500 ml of dimethylformamide at 100° C. for 2 hours and the mixture is worked up in a manner similar to that in Example 3. 80.1 g (90.1% of theory) of a brown, crystalline crude product, which is purified by recrystallisation in diethyl ether, are obtained. The colourless crystals having a melting point of 59.2°–60.9° C.

| Elementary analysis: | |
|---|---|
| calculated | found |
| 54.04% C | 54.23% C |
| 6.35% H | 6.51% H |
| 25.21% N | 24.86% N |

The 60 MHz-¹H-NMR spectrum agrees with the following structure:

$$H_3C-\underset{\underset{|}{CH_3}}{N}-\underset{\underset{\parallel}{O}}{\overset{\overset{NC}{|}}{C}}-CH-CH_2-CH_2-\overset{\overset{O}{\parallel}}{C}-\underset{\underset{|}{CN}}{N}-CH_3$$

EXAMPLE 19

4,4'-Methylene-bis-(N-acetyl-phenylcyanamide)

124.1 g (0.5 mol) of 4,4'-methylene-bis-(phenylcyanamide) and 510.5 g (1.0 mol+400% excess) of acetic anhydride are reacted at 73°–83° C. for 4 hours and 10 minutes, 465 ml of diethyl ether are then added and the mixture is cooled. The suspension is filtered with suction and the residue is dried at 50° C. in vacuo to give 139.6 g (84.0% of theory) of a crystalline product which, after recrystallisation from toluene, has a melting point of 134°–136° C.

| Elementary analysis: | calculated | found |
|---|---|---|
| | 68.66% C | 68.62% C |
| | 4.85% H | 4.92% H |
| | 16.86% N | 16.81% N |

Structure:

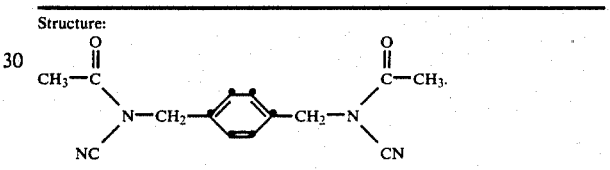

EXAMPLE 20

1,4-Bis-(N-acetyl-N-cyanoaminomethyl)-benzene 212.9 g (2.0 mols) of sodium acetylcyanamide and 175.1 g (1.0 mol) of α,α'-dichloroxylene are reacted in 800 ml of dimethylformamide at 120°–130° C. for 5 hours and 20 minutes and, when the reaction has ended, the mixture is filtered with suction, 750 ml of diisopropyl ether are added to the filtrate and the mixture is stirred at 0°–2° C. for 2 hours. The suspension is filtered with suction and the residue is dried at 60° C. under 0.13 mbar to give 170.8 g (63.2% of theory) of a crystalline product of melting point 160°–162° C.

| Elementary analysis: | |
|---|---|
| calculated | found |
| 62.21% C | 61.97% C |
| 5.22% H | 5.17% H |
| 20.73% N | 20.78% N |

Structure:

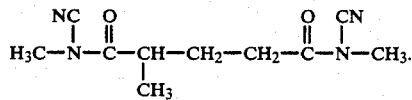

EXAMPLE 21

1,6-Bis-(N-acetyl-N-cyanoamino)-hexane 106.1 g (1.0 mol) of sodium acetylcyanamide and 77.5 g (0.5 mol) of 1,6-dichlorohexane are reacted in 750 ml of dimethylformamide at 146°–147° C. for 8 hours, the mixture is then filtered with suction and the filtrate is concentrated on a rotary evaporator at 80° C. in vacuo. 125 g (99.9% of theory) of a crude product, which is recrystallised from a mixture of acetone/diisopropyl ether (3:5), are obtained. The yield of pure substance is 58.8 g (46.9% of theory) and the product has a melting point of 59°–61° C.

| Elementary analysis: | |
|---|---|
| calculated | found |
| 57.58% C | 57.40% C |
| 7.25% H | 7.13% H |
| 22.39% N | 22.15% N |

Structure:

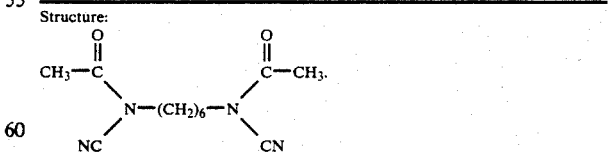

EXAMPLE 22 cis-1,4-Bis-(N-acetyl-N-cyanoamino)-but-2-ene 25.0 g (0.2 mol) of cis-1,4-dichlorobut-2-ene and 46.7 g (0.4 mol+10% excess) of sodium acetylcyanamide are reacted in 80 ml of dimethylacetamide at 70°–88° C. for 4 hours. The reaction mixture is then filtered with suction, the filtrate is introduced into 400 g of ice and the resulting suspension is filtered. The residue is dried over phosphorus pentoxide at room temperature under 0.13 mbar to give 29.4 g (66.7% of theory) of the desired compound, which has a melting point of 73.8°–75.2° C.

| Elementary analysis: | |
|---|---|
| calculated | found |
| 54.54% C | 54.74% C |
| 5.50% H | 5.44% H |
| 25.44% N | 25.44% N |

The $^{13}$C-NMR spectrum coincides with the following structure:

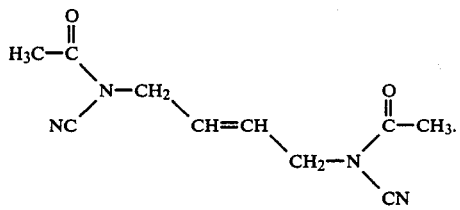

Use Examples

In the examples which follow, determination of the reactivity of the resin/hardener mixture by thermal analysis and determination of the glass transition temperatures are carried out as follows:

(a) Thermal analysis

Differential thermal analysis (DTA) is used to determine the reactivity. About 20 mg of the resin/hardener mixture to be tested are warmed in a small Al crucible in the measuring chamber of a DTA apparatus (TA-2000 from METTLER Instrumenta AG, CH-Greifensee) with a heating up rate of 4° C./minute, and the temperature difference in comparison with an empty crucible warmed at the same time is continuously recorded. The temperatures for the start of reaction ($T_S$), for the maximum rate of reaction ($T_{RR\,max}$) and for the end of the reaction ($T_E$) are read off from the resulting curve as parameters characterising the reactivities.

(b) Determination of the glass transition temperatures (GTT)

4 g of the resin/hardener mixture are in each case poured into a thin-walled aluminium crucible of about 5 cm diameter, and are hardened therein. A sample of the disc thus obtained is taken to determine the glass transition temperature of the crosslinked polymer with the aid of differential thermal analysis. At the transition temperature, the specific heat changes; this change is recorded as a change in direction in the curve recorded by the DTA apparatus (TA-2000 from METTLER Instrumente AG, CH-Greifensee). Conclusions relating to the heat distortion point of the resulting polymers can be drawn from the glass transition temperature.

EXAMPLE I 100 parts of an epoxide resin based on bisphenol A with an epoxide content of 2.1 equivalents/kg and an softening range of about 50° C. and 21.8 parts of the glutaric acid bis-(N-cyanomethylamide) obtained in Example 9 (corresponding to an equivalent ratio of N-cyanocarboxylic acid amide group to epoxide group of 1:1) are homogenised in an impact mill. The gelling time of the mixture thus obtained is determined as a function of the temperature and the thermoanalytical data.

Moulded sheets are cast from the same amounts of mixing components, the epoxide resin being heated to 120° C. by itself and the glutaric acid bis-(N-cyanomethylamide) being dissolved herein. In order to achieve perfect mouldings, the air which has been stirred into the hot solution is removed by vacuum treatment before casting.

| Gelling time at | 180° C. | 2'20" (minutes, seconds) |
|---|---|---|
| | 160° C. | 6'30" |
| | 140° C. | 14'10" |
| Thermal analysis | $T_S$ | 135° C. |
| | $T_{RRmax}$ | 170° C. and 258° C. |
| | $T_E$ | 303° C. |

After hardening at 100° C. for 2 hours and at 120° C. for 12 hours

| Flexural impact strength according to VSM 77,105[1] (KJ/m$^2$) | 28.8 |
|---|---|
| Flexural strength according to VSM 77,103 (N/mm$^2$) | 126/117* |
| Deflection according to VSM 77,103 (mm) | 8/10.8* |
| GTT | 121° C. |
| Heat distortion point according to ISO Standard 75[2] | 112° C. |
| Absorption of H$_2$O after storage in water at 23° C. for 4 days | 0.32% |
| Absorption of H$_2$O after storage in boiling water for 1 hour | 0.49% |
| Tensile shear strength according to DIN 53,283[3] (N/mm$^2$) | 14.5 |
| Dielectric loss factor tgδ, | |
| 1% value | 80° C. |
| 5% value | 105° C. |
| Dielectric constant at 23° C. | 3.5 |
| Specific volume resistivity at 23° C. (Ω · cm) | $1.1 \times 10^{17}$ |

[1]VSM = Verein Schweizerischer Maschinenindustrieller (Swiss Engineering Industry Association)
[2]ISO = International Standards Organisation
[3]DIN = Deutsche Industrie-Norm (German Industrial Standard)
*1st value under maximum load, 2nd value on breaking

EXAMPLE II 100 parts of an epoxide resin based on bisphenol A with an epoxide content of 5.78 equivalents/kg and a viscosity of 5,000 mPa.s at 25° C. are mixed with 64.2 parts of the adipic acid bis-(N-cyano-methylamide) prepared according to Example 2 (equivalent ratio 1:1) and 0.24 part of 1-methylimidazole, as a hardening accelerator, and the components are homogenised by means of a triple-roll mill for the purpose of determining the reactivity (gelling time, thermal analysis).

To produce moulded sheets from the same proportions of components of the mixture, the epoxide resin is heated to 120° C. with the hardening accelerator, and only then is the adipic acid bis-(N-cyano-methylamide) added. The resulting clear yellow solution is then cast into moulds heated to 100° C. and is hardened.

| Gelling time at | 180° C. | 7' |
|---|---|---|
| | 160° C. | 20'30" |
| | 140° C. | 52'30" |
| Thermal analysis | $T_S$ | 102° C. |
| | $T_{RRmax}$ | 175° C. |
| | $T_E$ | 217° C. |

After hardening at 100° C. for 2 hours and at 120° C. for 12 hours

| | | |
|---|---|---|
| Flexural impact strength (KJ/m²) | | 13 |
| Flexural strength (N/mm²) | | 130 |
| Deflection (mm) | | 6.5 |
| GTT | | 122° C. |
| Heat distortion point | | 104° C. |
| Absorption of H₂O after storage in water at 23° C. for 4 days | | 0.53% |
| Tensile shear strength (N/mm²) | | 13.9 |
| Dielectric loss factor tgδ, | | |
| 1% value | | 60° C. |
| 5% value | | 105° C. |
| Dielectric constant at 23° C. | | 3.6 |
| Specific volume resistivity at 23° C. (Ω · cm) | | $1.0 \times 10^{16}$ |

EXAMPLE III 100 parts of the epoxide resin used in Example I and 34.9 parts of the 4,4'-methylene-bis-(N-acetyl-phenyl-cyanamide) prepared according to Example 19 (equivalent ratio 1:1) are homogenised in an impact mill. The reactivity of the resulting mixture is determined.

To produce mouldings, the epoxide resin is heated to 120°–130° C. The 4,4'-methylene-bis-(N-acetylphenyl-cyanamide) according to the invention is dissolved therein at this temperature. As soon as a clear solution is obtained, the air which has been stirred in is removed by vacuum treatment before casting to mouldings.

| | | |
|---|---|---|
| Gelling time at | 180° C. | 4'55" |
| | 160° C. | 12' |
| | 140° C. | 31' |
| Thermal analysis | $T_S$ | 137° C. |
| | $T_{RRmax}$ | 174° C. |
| | $T_E$ | 241° C. |

After hardening at 120° C. for 12 hours

| | |
|---|---|
| Flexural impact strength (KJ/m²) | 26 |
| Flexural strength (N/mm²) | 133 |
| Deflection (mm) | 8.8 |
| GTT | 110° C. |
| Heat distortion point | 106° C. |
| Absorption of H₂O after storage in water at 23° C. for 4 days | 0.26% |
| Absorption of H₂O after storage in boiling water for 1 hour | 0.24% |
| Tensile shear strength (N/mm²) | 13.6 |
| Dielectric loss factor tgδ, | |
| 1% value | 96° C. |
| 5% value | 115° C. |
| Dielectric constant at 23° C. | 3.4 |
| Specific volume resistivity at 23° C. (Ω · cm) | $4.5 \times 10^{16}$ |

EXAMPLE IV 100 parts of an epoxide resin which is liquid at room temperature, is based on bisphenol A and has an epoxide content of 5.35 equivalents/kg and a viscosity of 10,000 mPa.s at 25° C. are mixed thoroughly with 63.1 parts of the glutaric acid bis-(N-cyano-ethylamide) prepared according to Example 10, which is also liquid at room temperature. The viscosity of the clear solution thus prepared is determined at 25° C. by means of the Hoeppler falling ball method (initial viscosity). The rise in viscosity is monitored until the initial viscosity has doubled.

| | |
|---|---|
| Initial viscosity at 25° C.: | 975 mPa · s |
| Doubling of the initial viscosity at 25° C.: | >210 days |

What is claimed is:

1. A curable epoxy resin composition which comprises
   (a) an epoxy resin having more than one epoxy group per molecule, and
   (b) an effective amount of an N-cyanocarboxylic acid amide derivative which contains two or three $$\begin{array}{c} -\text{N}-\text{CO}- \\ | \\ \text{CN} \end{array}$$

groups in the molecule and has one of the formulae I to III

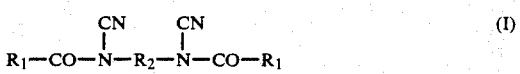  (I)

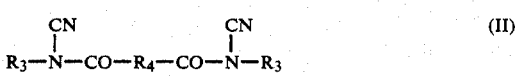  (II)

and

  (III)

in which $R_1$ is alkyl having 1 to 8 carbon atoms, said alkyl substituted by chlorine, by bromine or by nitro, cycloalkyl having 5 to 8 carbon atoms, aryl having 6 or 10 ring carbon atoms or said aryl substituted by 1 or 2 chlorine, by 1 or 2 bromine, by 1 or 2 nitro, by 1 or 2 alkyl of 1 to 4 carbon atoms or by 1 or 2 alkoxy of 1 to 4 carbon atoms, $R_2$ is alkylene having 2 to 12 carbon atoms, said alkylene interrupted by O or S atoms, but-2-enylene, but-2-ynylene, phenylenedimethylene or a radical of the formula

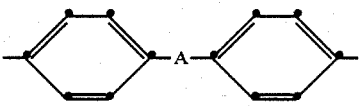

in which —A— is —CH₂—, —SO₂— or —O—, $R_3$ is alkyl having 1 to 8 carbon atoms, said alkyl substituted by chlorine, by bromine or by nitro, cycloalkyl having 5 to 8 carbon atoms, allyl methallyl, phenyl, phenyl substituted by 1 or 2 chlorine, by 1 or 2 bromine, by 1 or 2 nitro, by 1 or 2 alkyl of 1 to 4 carbon atoms or by 1 or 2 alkoxy of 1 to 4 carbon atoms or $R_3$ is aralkyl having not more than 12 carbon atoms, or said aralkyl substituted on the ring by 1 or 2 chlorine, by 1 or 2 bromine, by 1 or 2 nitro or by 1 or 2 alkyl of 1 to 4 carbon atoms, $R_4$ is a direct bond, alkylene having 1 to 12 carbon atoms, said alkylene interrupted by O or S atoms, 1,3-cyclohexylene, 1,4-cyclohexylene, 1,3-phenylene or 1,4-phenylene, and $R_5$ is a radical of the formula 2. A composition according to claim 1 wherein component (b) is an N-cyanocarboxylic acid amide derivative of one of formulae I to III in which $R_1$ is alkyl having 1 to 4 carbon atoms, cyclohexyl, phenyl or phenyl substituted by 1 or 2 chlorine, by 1 or 2 bromine, by 1 or 2 nitro, by 1 or 2 alkyl of 1 to 4 carbon atoms or by 1 or 2 alkoxy of 1 to 4 carbon atoms, $R_2$ is alkylene having 2 to 6 carbon atoms, phenylenedimethylene or a radical of the formula

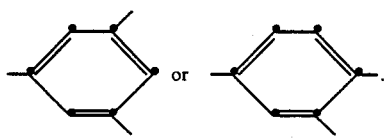

in which —A— is —$CH_2$—, —$SO_2$— or —O—, $R_3$ is alkyl having 1 to 4 carbon atoms, allyl, benzyl or benzyl substituted on the ring by 1 or 2 chlorine, by 1 or 2 bromine, by 1 or 2 nitro or by 1 or 2 alkyl of 1 to 4 carbon atoms, $R_4$ is alkylene having 2 to 8 carbon atoms, 1,3-cyclohexylene, 1,4-cyclohexylene, 1,3-phenylene or 1,4-phenylene, and $R_5$ is a radical of the formula 3. A composition according to claim 2 wherein component (b) is an N-cyanocarboxylic acid amide derivative of formula I or of formula II.

* * * * *